US007607620B2

(12) United States Patent
Ozolins et al.

(10) Patent No.: US 7,607,620 B2
(45) Date of Patent: Oct. 27, 2009

(54) SUPPORT FOR ONE OR MORE FLAT PANEL DISPLAYS

(75) Inventors: Helmars E. Ozolins, Orient, NY (US);
Masamichi Udagawa, New York, NY (US); Alfonso Castagna, Etobicoke (CA)

(73) Assignee: Bloomberg Finance L.P., New York, NY (US)

( * ) Notice: Subject to any disclaimer, the term of this patent is extended or adjusted under 35 U.S.C. 154(b) by 0 days.

(21) Appl. No.: 10/300,698

(22) Filed: Nov. 20, 2002

(65) Prior Publication Data

US 2004/0041062 A1    Mar. 4, 2004

Related U.S. Application Data

(63) Continuation-in-part of application No. 29/166,843, filed on Sep. 3, 2002, now Pat. No. Des. 496,362, and a continuation-in-part of application No. 29/166,844, filed on Sep. 3, 2002, now Pat. No. Des. 496,363.

(51) Int. Cl.
*A47F 5/00* (2006.01)

(52) U.S. Cl. .............................. 248/122.1; 248/292.14; 248/919; 248/922

(58) Field of Classification Search .............. 248/125.7, 248/122.1, 299.1, 292.14, 278.1, 922, 919; 361/681; 349/184
See application file for complete search history.

(56) References Cited

U.S. PATENT DOCUMENTS

| 1,497,200 | A | * | 6/1924 | Tripp et al. | 248/122.1 |
|---|---|---|---|---|---|
| 1,570,657 | A | * | 1/1926 | White et al. | 248/122.1 |
| 1,826,843 | A | * | 10/1931 | Thomas | 248/299.1 |
| 2,598,529 | A | * | 5/1952 | Fritz | 248/457 |
| 3,889,910 | A | * | 6/1975 | Walters | 248/122.1 |
| 4,159,417 | A |   | 6/1979 | Rubincam |   |

(Continued)

FOREIGN PATENT DOCUMENTS

EP    1 584 857 A    10/2005

(Continued)

OTHER PUBLICATIONS

Smartglas Mounting Options, http://www.pixelvision.com/sgmount.htm, dated Sep. 8, 1998, pp. 1-4.

(Continued)

*Primary Examiner*—Korie Chan
(74) *Attorney, Agent, or Firm*—Frank J. DeRosa; Frommer Lawrence & Haug LLP

(57) ABSTRACT

A support for at least one flat panel monitor, or display, permits adjustment of the display in one or two axes. The support includes an oblong support element connected to the rear of the display at two spaced locations. In preferred embodiments, the oblong support extends parallel to the rear of the display. First axis adjustable couplings are provided at each of the two locations that permit adjustment of the at least one flat panel display in a first axis. In embodiments that provide for adjustability in two axes, at least one second axis adjustable coupling is provided between the two locations to permit adjustment in a second axis. In these embodiments, the adjustment mechanism may be gimbal-like. In the preferred embodiments, adjustment in both axes is limited.

30 Claims, 10 Drawing Sheets

U.S. PATENT DOCUMENTS

| | | | |
|---|---|---|---|
| D278,820 S | 5/1985 | Woodhall | |
| 4,740,786 A | 4/1988 | Smith | |
| D305,646 S | 1/1990 | Kato et al. | |
| D305,647 S | 1/1990 | Kato et al. | |
| 5,076,524 A | 12/1991 | Reh et al. | |
| 5,122,941 A | 6/1992 | Gross et al. | |
| 5,153,575 A | 10/1992 | Watts, Jr. et al. | |
| 5,170,156 A | 12/1992 | DeMond et al. | |
| 5,224,861 A | 7/1993 | Glass et al. | |
| D340,235 S | 10/1993 | Robak et al. | |
| 5,673,170 A | 9/1997 | Register | |
| 5,687,939 A | 11/1997 | Moscovitch | |
| 5,725,192 A * | 3/1998 | Cloninger | 248/458 |
| 5,738,316 A * | 4/1998 | Sweere et al. | 248/123.11 |
| D395,041 S | 6/1998 | Leveridge et al. | |
| D395,298 S | 6/1998 | Rosen | |
| 5,797,568 A * | 8/1998 | Canton Gongora et al. | 248/122.1 |
| D404,026 S | 1/1999 | Hasegawa | |
| 5,904,328 A | 5/1999 | Leveridge et al. | |
| 5,918,841 A | 7/1999 | Sweere et al. | |
| 5,944,896 A * | 8/1999 | Landesman et al. | 118/500 |
| 5,949,643 A | 9/1999 | Batio | |
| 6,015,120 A | 1/2000 | Sweere et al. | |
| 6,019,332 A | 2/2000 | Sweere et al. | |
| D425,036 S | 5/2000 | Copus et al. | |
| 6,061,104 A | 5/2000 | Evanicky et al. | |
| 6,094,340 A | 7/2000 | Min | |
| 6,102,348 A * | 8/2000 | O'Neill | 248/289.11 |
| RE36,978 E | 12/2000 | Moscovitch | |
| 6,189,842 B1 | 2/2001 | Bergeron Gull et al. | |
| 6,212,068 B1 | 4/2001 | Rooyakkers et al. | |
| 6,216,989 B1 | 4/2001 | Shioya et al. | |
| 6,233,138 B1 | 5/2001 | Osgood | |
| 6,276,655 B1 | 8/2001 | Byoun | |
| 6,343,006 B1 | 1/2002 | Moscovitch et al. | |
| 6,378,830 B1 * | 4/2002 | Lu | 248/278.1 |
| 6,394,403 B1 * | 5/2002 | Hung | 248/276.1 |
| D458,257 S | 6/2002 | Rosen et al. | |
| D458,603 S | 6/2002 | Lee | |
| D458,604 S | 6/2002 | Ma et al. | |
| D458,927 S | 6/2002 | Wang et al. | |
| 6,419,196 B1 | 7/2002 | Sweere et al. | |
| 6,427,288 B1 | 8/2002 | Saito | |
| 6,449,143 B2 | 9/2002 | Rooyakkers et al. | |
| 6,513,197 B2 * | 2/2003 | Rude et al. | 16/342 |
| 6,517,040 B1 * | 2/2003 | Wen | 248/278.1 |
| 6,575,419 B1 | 6/2003 | Masuda et al. | |
| 6,581,887 B2 * | 6/2003 | Lapidez | 248/122.1 |
| 6,708,940 B2 * | 3/2004 | Ligertwood | 248/324 |
| 6,863,252 B2 * | 3/2005 | Bosson | 248/278.1 |
| 6,905,101 B1 * | 6/2005 | Dittmer | 248/274.1 |
| 6,915,995 B2 * | 7/2005 | Gillespie | 248/278.1 |
| 2002/0011544 A1 | 1/2002 | Bosson | |
| 2002/0020792 A1 | 2/2002 | Lee | |
| 2002/0130981 A1 | 9/2002 | Ma et al. | |
| 2002/0149906 A1 | 10/2002 | Ichimura | |
| 2003/0189155 A1 * | 10/2003 | Serbinski et al. | 248/371 |
| 2005/0257145 A1 | 11/2005 | Gage | |
| 2008/0055832 A1 | 3/2008 | Ozolins | |

FOREIGN PATENT DOCUMENTS

| | | |
|---|---|---|
| GB | 2 390 800 | 1/2004 |
| JP | 3-291722 | 12/1991 |
| JP | 10-55165 | 2/1998 |
| JP | 11 007250 | 1/1999 |
| JP | 11-271730 | 10/1999 |
| JP | 2004-191601 A | 7/2004 |
| WO | WO 01/37070 A2 | 5/2001 |
| WO | WO 03/092341 A2 | 11/2003 |

OTHER PUBLICATIONS

Smartglas System Components, http://www.pixelvision.com/sgcomp.htm, dated Sep. 8, 1998, pp. 1-3.

Bloomberg LP, "The Bloomberg® Flat Panel," brochure, Copyright 2000, 4 pages.

* cited by examiner

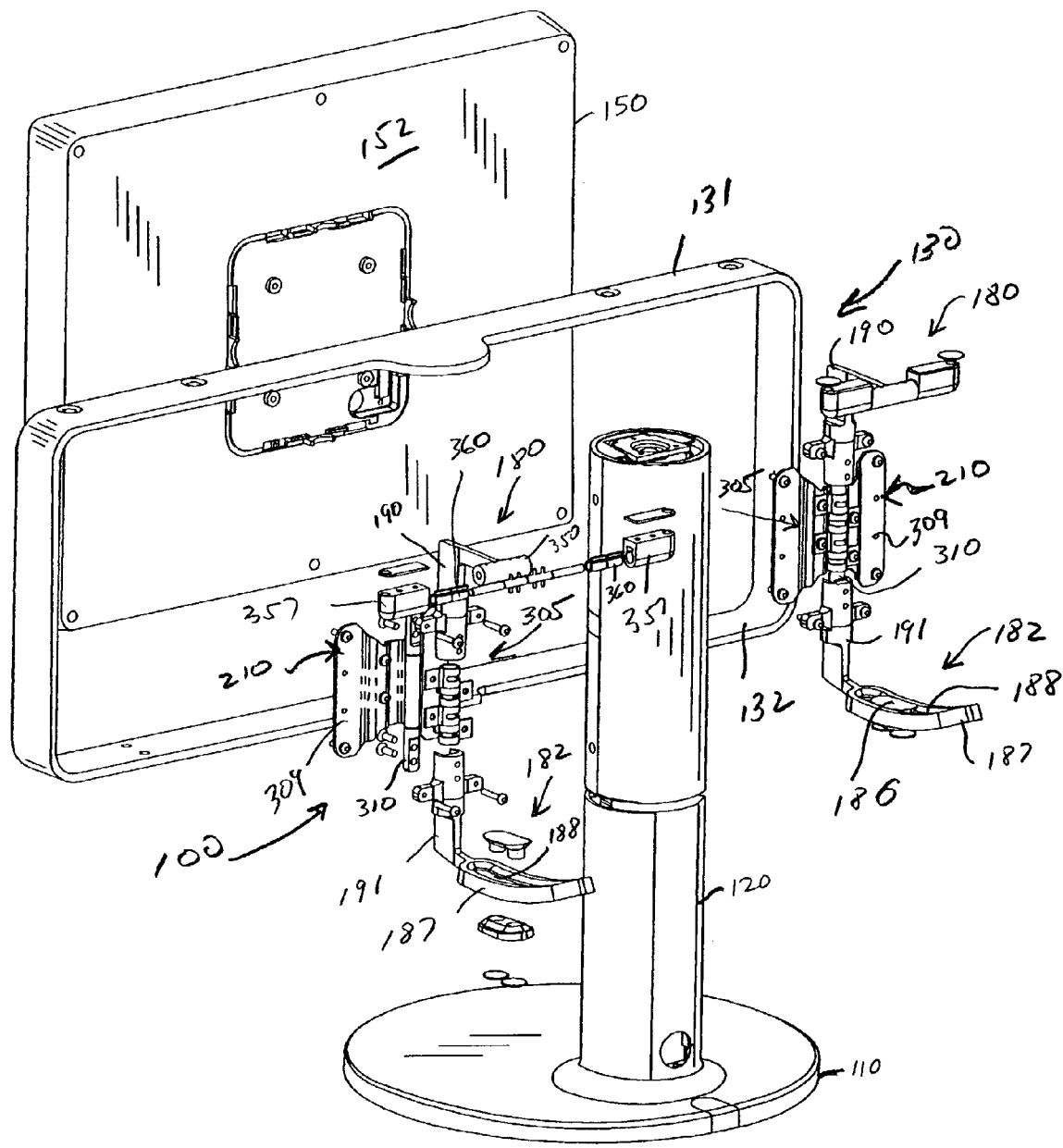
FIG. 9
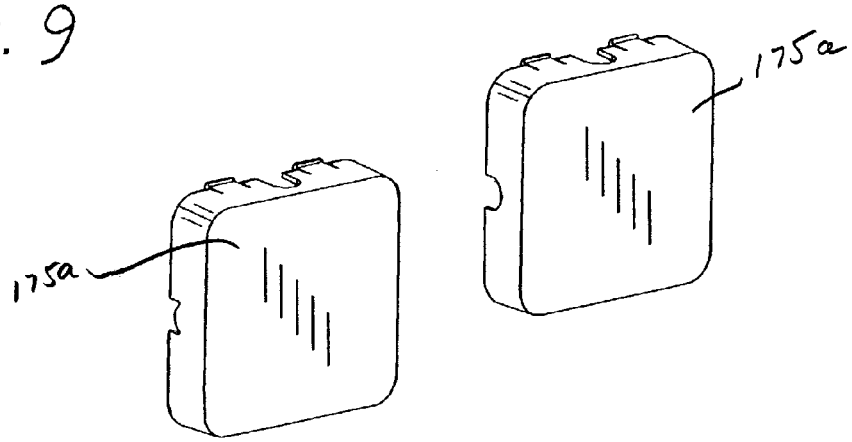

SUPPORT FOR ONE OR MORE FLAT PANEL DISPLAYS

This application claims the benefit and is a continuation-in-part of U.S. Design patent applications Ser. Nos. 29/166,843 now U.S. Pat. No. D,496,362 and 29/166,844, now U.S. Pat. No. D,496,363 both of which were filed on Sep. 3, 2002, and both of which are incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND OF THE INVENTION

The invention relates to a support for one or more flat panel displays, e.g., monitors, touch screens and other displays used in various applications, including personal computers, televisions, industrial machinery, etc.

U.S. Pat. Nos. 5,687,939 and 6,276,655 disclose supports for flat panel displays.

SUMMARY OF THE INVENTION

The invention provides a support for at least one flat panel display that permits adjustment of the at least one flat display in one axis or two axes. In accordance with the invention, the support includes an oblong support element at the rear of the at least one panel connected to the rear of the at least one flat panel display at two spaced locations. In the preferred embodiments, the oblong support extends parallel to the rear of the at least one flat panel display in at least one position thereof, but need not. First axis adjustable couplings are provided at each of the two locations that permit adjustment of the at least one flat panel display in a first axis. In embodiments that provide for adjustability in two axes, at least one second axis adjustable coupling is provided between the two locations to permit adjustment in a second axis. In these embodiments, the adjustment mechanism may be gimbal-like. In the preferred embodiments, adjustment in both axes is limited.

The oblong support element may comprise two spaced members, to each of which is connected an first axis adjustable coupling for adjustment in the first axis. Alternatively, the oblong support element may comprise one member positioned between the two locations, to which is connected another element that extends between the two locations. A first axis adjustable coupling is connected to the other member at each of the two locations. For an embodiment in which adjustment is permitted in only the first axis, each first axis adjustable coupling is rigidly connected, directly or indirectly, to the rear of the at least one flat panel display.

The first axis adjustable couplings preferably comprise at least one pivot joint and means for maintaining the at least one flat panel display in an adjusted position in the first axis. The at least one pivot joint and such means may permit continuous adjustment or stepped adjustment of the at least one flat panel display in the first axis. In the preferred embodiment, one first axis adjustable coupling comprises a hinge and the other first axis adjustable coupling comprises a sliding coupling. Either or both the hinge or the sliding coupling element provides for frictional engagement to maintain the at least one flat panel display in an adjusted position in the first axis. Alternatively, detents or stops can be provided in or in association with either the hinge or the sliding coupling which are engaged to maintain the at least one flat panel display in an adjusted position, with such engagement being overcome by application of a suitable force to re-adjust the at least one flat panel display in the first axis. In a preferred embodiment, the hinge comprises a friction hinge.

In the preferred embodiment, at least one second axis adjustable coupling is provided to permit adjustment of the at least one flat panel display in a second axis perpendicular to the first axis. This second axis adjustable coupling is located between the first and second locations and, with the first axis adjustable couplings, provides a gimbal-like adjustment mechanism. In the preferred embodiment, a shaft 310 (FIG. 10) extending adjacent the rear of the at least one flat panel display is rigidly connected, directly or indirectly, at its ends to the first axis adjustable couplings, and in a central region to the at least one flat panel display by at least one a pivot joint, e.g., a friction hinge 210 (FIG. 10). Preferably, the shaft extends parallel to the rear of the at least one flat panel display, but need not. Thus, the at least one flat panel display may be rotated about the axis of the shaft to adjust the position of the at least one flat panel display in the second axis.

Preferably, the at least one second axis adjustable coupling comprises a pivot joint and means for maintaining the at least one flat panel display in an adjusted position in the second axis. The at least one pivot joint and such means may permit continuous adjustment or stepped adjustment of the at least one flat panel display in the second axis. In the preferred embodiment, the pivot joint comprises a bearing or a hinge which provides for frictional engagement to maintain the at least one flat panel display in an adjusted position in the second axis. Alternatively, detents or stops can be provided in or in association with the bearing or hinge which is engaged to maintain the at least one flat panel display in an adjusted position, with such engagement being overcome by application of a suitable force to re-adjust the at least one flat panel display in the second axis. In the preferred embodiment, the at least one pivot joint comprises a friction bearing or friction hinge.

In the preferred embodiment, the oblong support element comprises a relatively thin bar or rod extending in the shape of a full or partial loop. The loop may resemble all or part of a rectangle or oval. The two spaced members referred to above form opposed parts of the loop and are connected together directly and/or through a central (relative to the at least one display panel) support element, that can rest on or be attached to a desktop or other horizontal surface and extend vertically therefrom, or that can be attached to a vertical wall or work surface and extend horizontally therefrom. In the alternative embodiment, the oblong support element comprises a thin bar or rod extending between the two locations and connected to the central support element.

In other embodiments, the invention provides a support for two flat panel displays arranged either horizontally or vertically aligned. In these embodiments, an oblong element as described above extends horizontally at the rear of each of the horizontally aligned flat panel displays and vertically at the rear of each of the vertically aligned flat panel displays. Each of the oblong elements is connected to the same central support and extend therefrom in opposite directions. In the preferred loop embodiments, each oblong element forms or appears to form part of a larger composite loop.

In the embodiments that support two flat panel display, the respective support can be scaled or otherwise modified to support three or more flat panel displays. In one embodiment, the support supports four flat panel displays arranged in two vertically aligned columns (or two horizontally aligned rows). In these embodiments, the oblong element also extends from the central support to two flat panel displays as discussed above.

In accordance with the invention, the use of thin bar(s) or rod(s), while achieving required support functions, presents an esthetically pleasing and distinctive appearance, particularly the embodiment including the loop, and particularly the loop embodiment for supporting two or four-flat panel displays. The use of thin bars or rods minimizes bulk so as not to visually obstruct or encumber the rear of each flat panel display The mechanism or mechanisms provided by the invention for adjusting the at least one flat panel display are either substantially hidden from view or appear streamlined or lightweight and uncomplicated.

BRIEF DESCRIPTION OF THE FIGURES

The invention is illustrated in the figures of the accompanying drawings which are meant to be exemplary and not limiting, in which like references are intended to refer to like or corresponding parts, and in which:

FIG. 9 is an exploded, rear perspective view of the support depicted in FIG. 1 and one of the flat panel displays depicted in FIG. 1.

DETAILED DESCRIPTION OF THE PREFERRED EMBODIMENTS

Figure 1:
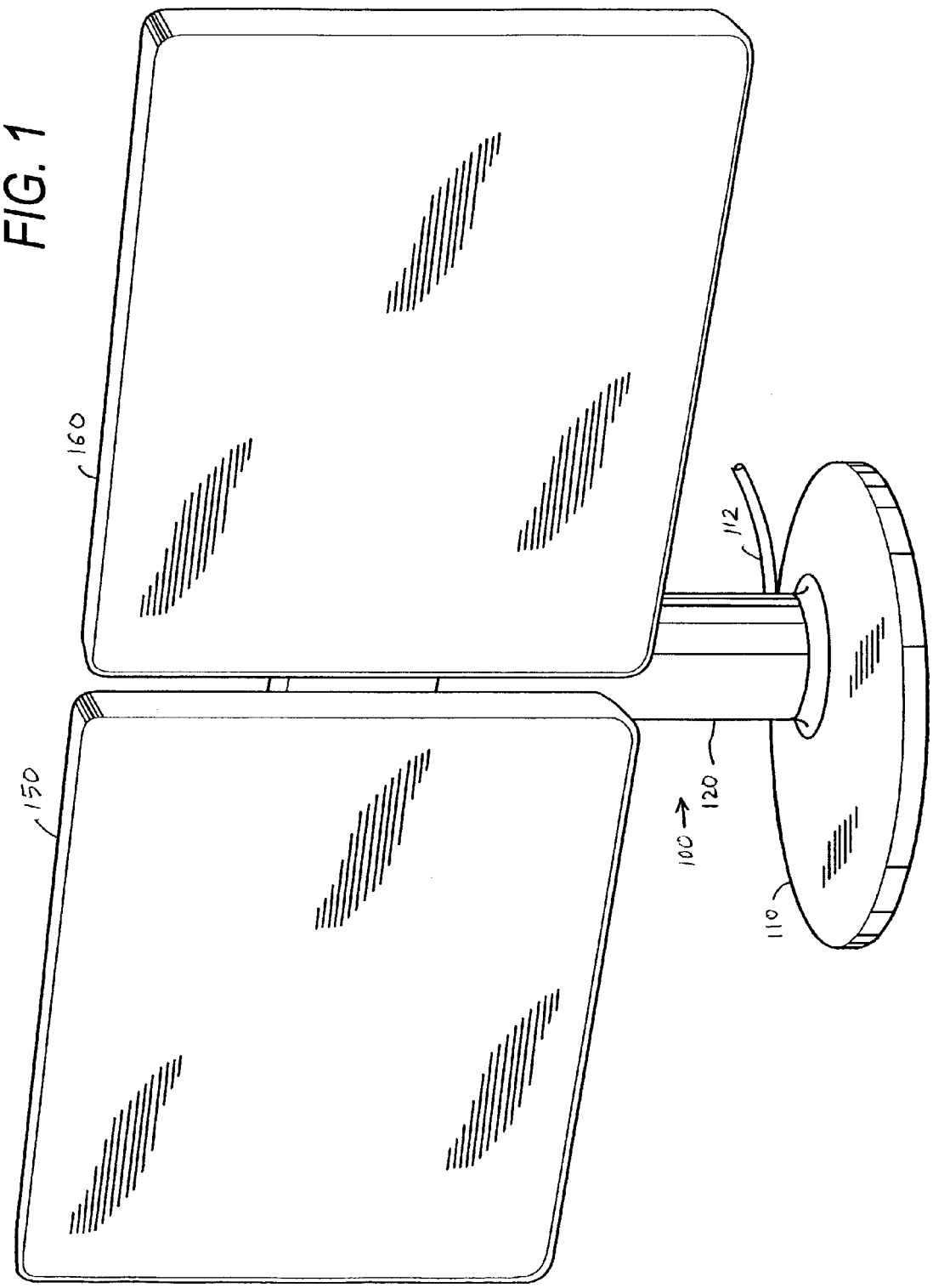
FIG. 1 is a front perspective view of dual horizontally arranged flat panel displays and a support therefore in accordance to the invention.

Referring to FIG. 1, a support generally referenced by 100 supports two flat panel displays 150, 160 in a horizontally aligned relationship. The support 100 includes a base or pedestal 110 and a centrally located (relative to the flat panel displays 150, 160) vertical column 120 (an embodiment of the central support element referred to above) to which the flat panel displays 150, 160 are adjustably connected by the support structure depicted in FIGS. 2-4, 7 and 9-10. The pedestal 110 rests on a desktop or tabletop or other horizontal support surface. Wiring harness 112 provides display signals from a computer and electrical power to the flat panel displays 150, 160.

The inventive support may also be used to support a single flat panel display (FIG. 8) or two flat panel display in a vertically aligned relationship (FIG. 5), or scaled to support four flat panel displays (not shown) in two rows of horizontally aligned flat panel displays similar to the row shown in FIG. 1. Alternatively, a single flat panel display may be supported centered above the horizontally aligned displays depicted in FIG. 1 using the support structure depicted in FIG. 8. If necessary, additional pedestals and/or columns may be used.

Figure 3:
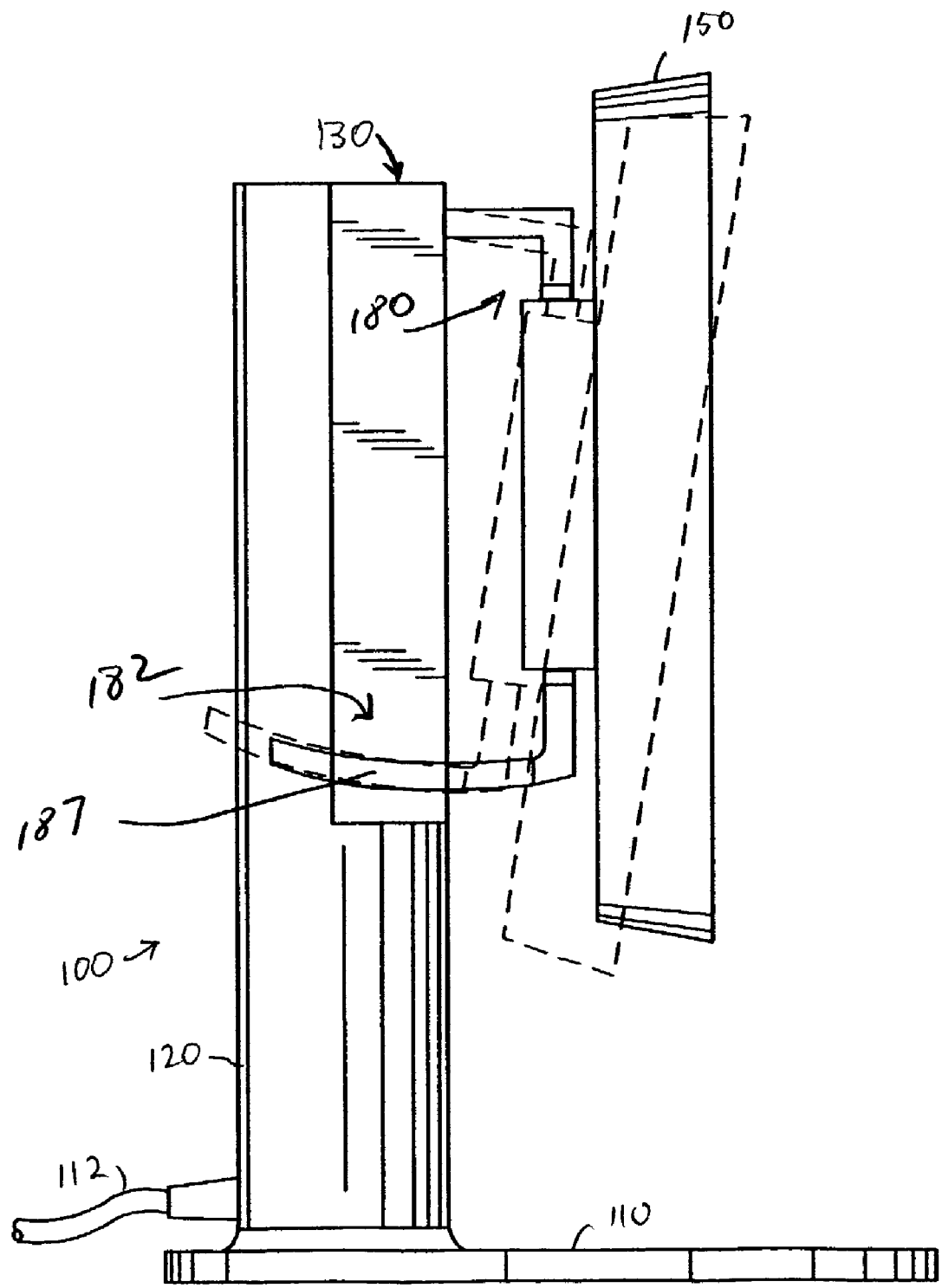
FIG. 3 is a side view of the dual flat panel displays and support depicted in FIG. 1.
Figure 4:
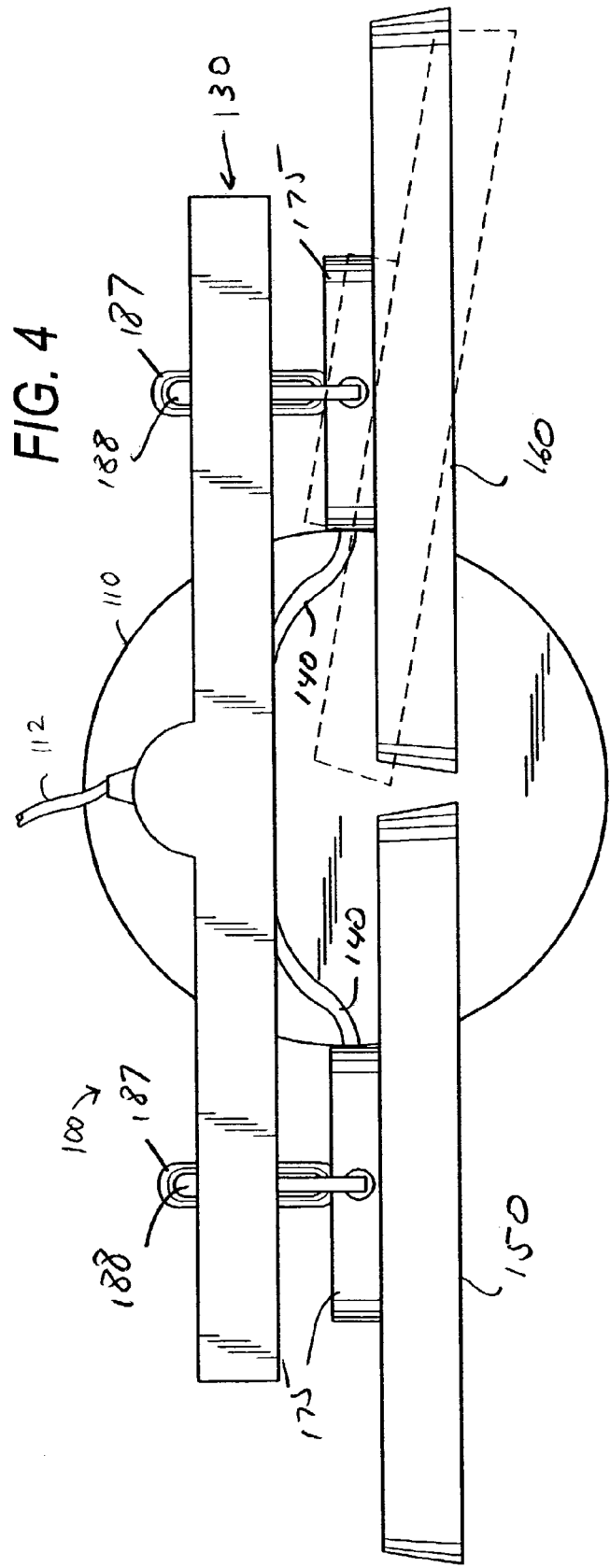
FIG. 4 is a top view of the dual flat panel displays and support depicted in FIG. 1.

The support 100 permits limited adjustment of each display 150, 160 (independently of each other) with respect to a horizontal axis and a vertical axis (the first and second axes referred to above). FIG. 3 illustrates in broken lines adjustment of display 150 with respect to the horizontal axis, i.e., up/down tilting, and FIG. 4 illustrates in broken lines adjustment of display 160 with respect to a vertical axis, i.e., left/right tilting. (The terms up/down and left/right refer to disposition of the front of display 150 with respect to its home position described below.)

Figure 2:
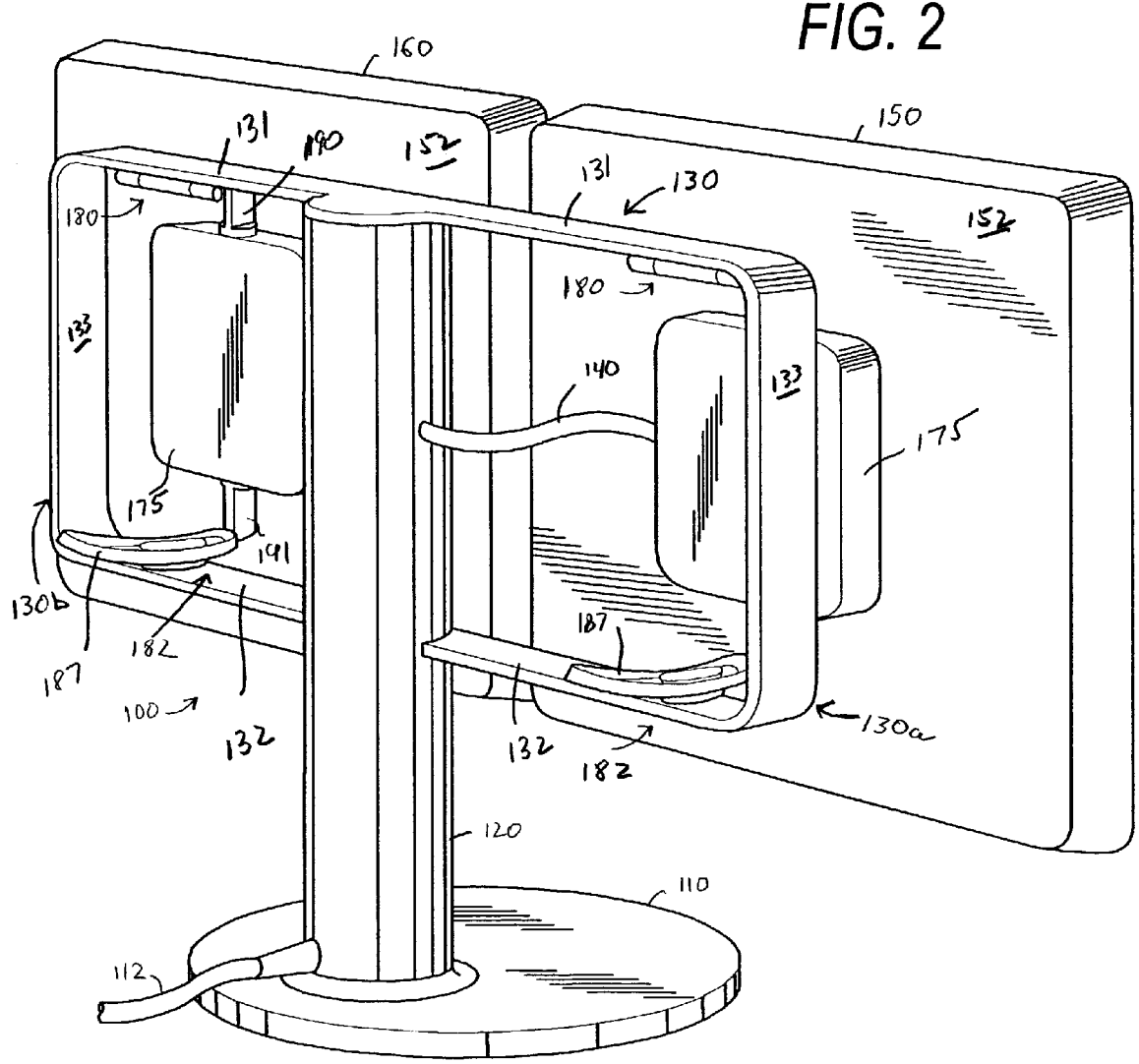
FIG. 2 is a rear perspective view of the dual flat panel displays and support depicted in FIG. 1.

Referring to FIG. 2, the support 100 includes a frame 130 (an embodiment of the oblong element referred to above), which, in the preferred embodiment, generally has a rectangular, oval or other oblong shape. The frame is supported by the column 120 at a suitable distance from the pedestal 110, so that the displays 150, 160 are positioned a suitable height from a work surface on which the pedestal rests. The frame 130 includes a loop 130a, 130b for each flat panel display 150, 160, respectively. For a single flat panel display (FIG. 8), a single loop 130c is used. The frame 130 and loops 130a, 130b extend parallel to the rear 152 of the flat panel display devices 150 and 160, at least when they are in a home position, as depicted in FIGS. 1 and 2. In the home position, the front and/or rear of each display 150, 160 is parallel with the vertical, and the two displays are horizontally aligned. A wiring harness 140 runs from the rear of each display 150, 160 into the column 120.

Referring to FIG. 2, wiring harnesses 140 are combined into the wiring harness 112 in column 120, which exits the column 120 near the pedestal 110 (or in an alternate embodiment, from the pedestal). Thus, the wiring harnesses are hidden within column 120, and neatly run from the rears of the displays 150, 160 to the column 120. This arrangement provides an aesthetically pleasing way to run wires from the displays 150, 160 to a computer and a source of electrical power.

Since the frame structure and couplings for mounting each display 150, 160 to the rear of the respective display is the same, such structure will be described with respect to display 150 with the understanding that the description also applies, as appropriate, to display 160.

Referring to FIG. 2, each loop 130a, 130b of the frame 130 includes an upper and lower horizontally extending frame part 131, 132 and a vertically extending frame part 133. At the ends of loop 130a opposite frame part 133, the loop 130a is attached to the column 120. In the preferred embodiment, as shown in FIG. 910, the frame 130 defines a single, rectangularly shaped loop before it is attached to the column 120. Thus, the frame 130 may comprise a single large loop as shown in FIG. 9, or two smaller loops, each attached to the column 120.

An upper first axis adjustable coupling 180 (for up/down tilting) adjustably connects the upper frame part 131 to the rear of the display 150 (through another coupling 210 described below), and a lower first axis adjustable coupling 182 adjustably connects the lower frame part 132 to the rear of the display 150 at the two spaced locations referred to above. The upper adjustable coupling 180 in the preferred embodiment comprises a friction hinge. The lower adjustable coupling 182 is a sliding coupling which provides forward/rear motion and also performs a camming function to assist in tilting the display 150 up and down during up/down adjustment thereof. Both the friction hinge 180 and the sliding coupling 182 are streamlined in appearance so as to provide an aesthetically pleasing appearance to those parts.

Figure 7:
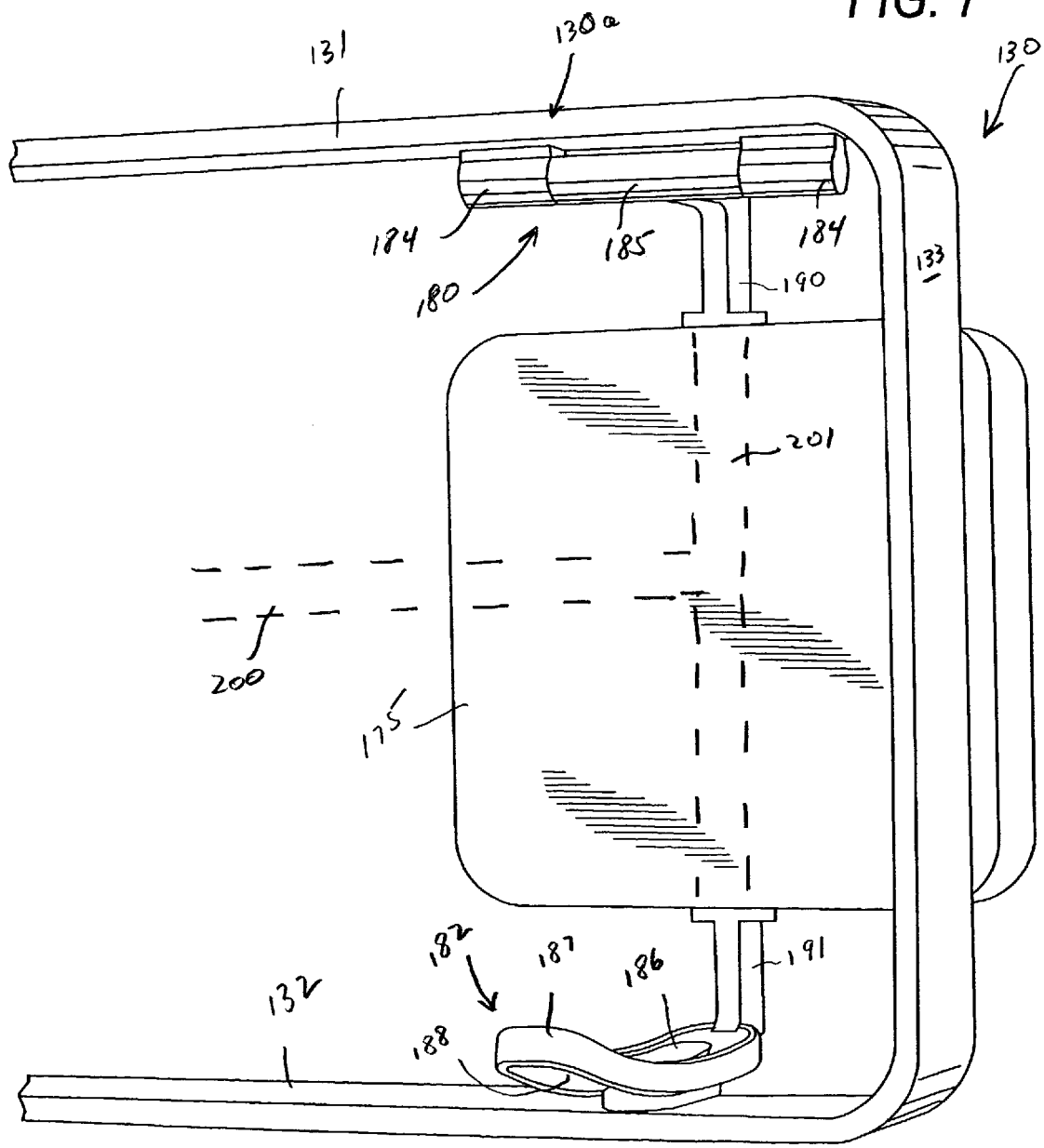
FIG. 7 is a rear perspective view of the adjustment mechanism for adjusting a flat panel display of the horizontal arrangement of FIG. 1 or the vertical arrangement of FIG. 5.

Referring to FIG. 7, the friction hinge 180 has one hinge part 184 rigidly connected to the frame part 131, and another hinge part 185 that extends-to and is adjustably coupled to the rear 152 of the display 150. The hinge 180 permits limited left/right tilting, and is discussed in more detail below in connection with FIGS. 9-10. Similarly, the sliding coupling 182 has a guide button 186 rigidly connected to the frame part 132 and a slotted bracket 187 that extends to and is adjustably coupled to the rear of the display 150. The bracket 187 has a slot 188 in which the guide button 186 is slidably engaged. Opposed ends of the slot 188 function as stops, and limit the range of up/down adjustment. The bracket 187 is curved to allow or cam the display 150 to tilt as it is moved away from and towards the frame 130. The home position is that in which the guide button 186 is in the center of the slot 188, so that the display 150 can be tilted equally up/down from the home position.

As shown in FIG. 7, the hinge part 185 includes a vertically extending portion 190, and the sliding coupling part 187 includes a vertically extending portion 191, both of which enter a compartment 175 at the rear 152 of the display 150. In this embodiment, some of the vertical portion 190 of the hinge part 185 and some of the vertical portion 191 of sliding coupling part 182 are exposed and are visible from the rear of display 150. In another embodiment, the compartment 175 covers these vertical portions.

Figure 10:
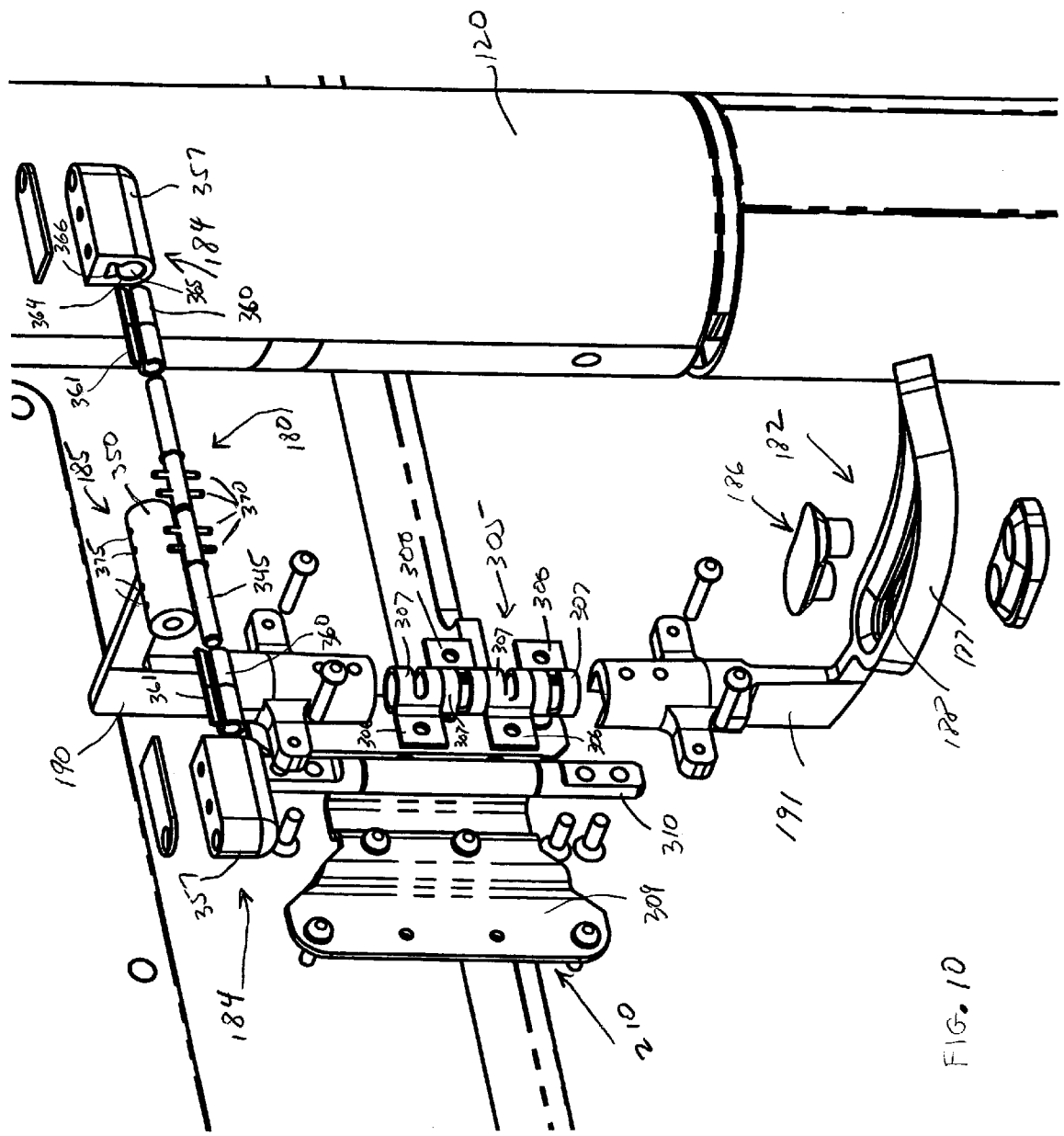
FIG. 10 is an enlarged perspective view of the coupling mechanism for adjustments in two perpendicular axes of the adjustment mechanism of the support depicted in FIG. 1.

Referring to FIGS. 9 and 10, the vertical portions 190 and 191 of the hinge 180 and the sliding coupling 182 are each connected to an opposite end of a shaft 310 that is rotatably coupled to the rear of display 150 by a pivot joint 210 depicted in FIGS. 9 and 10. This permits limited left/right adjustment of the display 150, as discussed in more detail in connection with FIGS. 9 and 10. The hinge 180 and the pivot joint 210 frictionally maintain the display 150 in an adjusted up/down and left/right position, respectively.

In another embodiment (not shown), the frame 130 is replaced by a horizontal member 200 (represented by the horizontal broken lines in FIG. 7) connected to column 120 extending at approximately the center of the frame 130. Another vertical member 201 (represented by the vertical broken lines in FIG. 7) is connected to the horizontal member 200. The hinge 180 and the sliding coupling 182 are then connected to opposite ends of the vertical member 201 at the spaced locations referred to above.

Figure 5:
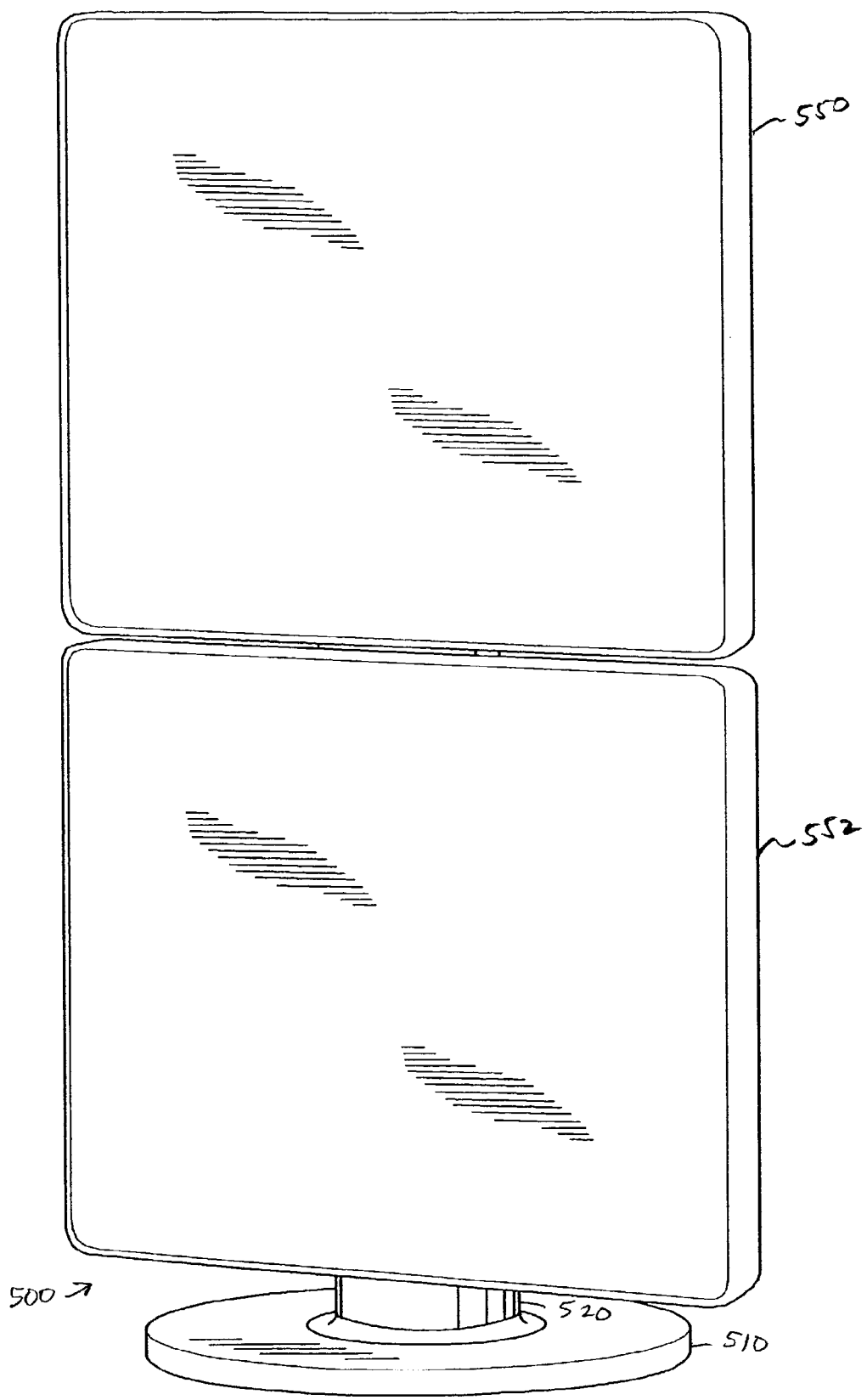
FIG. 5 is a front perspective view of dual vertically arranged flat panel displays and a support therefore in accordance to the invention.
Figure 6:
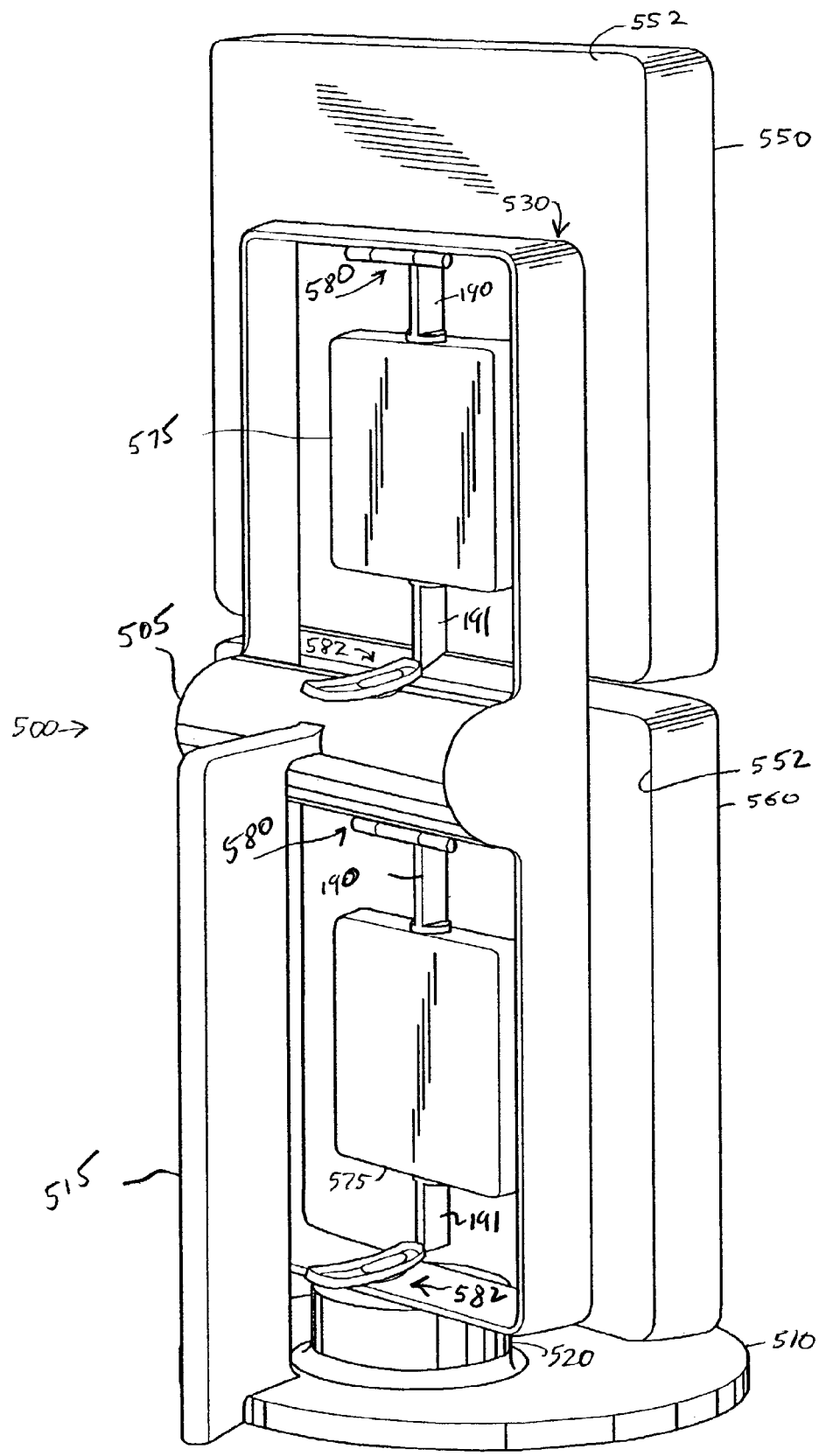
FIG. 6 is a rear view of the dual flat panel displays and support depicted in FIG. 5.

In the embodiment depicted in FIGS. 5 and 6, the flat panel display devices 550, 560 are supported in a vertically aligned relationship by a support referenced generally by 500. (The last two digits of the reference numbers used in FIGS. 1-4 and 7 and those used in FIGS. 5 and 6 refer to corresponding parts.) Referring to FIG. 6, the support 500 includes a frame 530 to which are connected hinges 580 and sliding couplings 582. The cylindrical portion 505 partially corresponds to the column 120, except it extends horizontally instead of vertically. The frame 530 and cylindrical portion 505 are supported by vertical support members 515 and 520 connected to the pedestal 510 and the frame 530 and the cylindrical portion 505 of the frame 530, respectively. The connection to the cylindrical portion 505 is at a suitable distance above the pedestal 510 to position the displays 550, 560 at a suitable height from a work surface on which the pedestal rests. The vertical portions 190, 191 of the hinge 180 and sliding coupling 182 enter the compartment 175 and are rotatably coupled to the rear of the respective display 550, 552 as described in connection with the embodiment depicted in FIGS. 1-2. Up/down and left/right adjustment proceeds as described for the embodiment depicted in FIGS. 1-2. Also, a single member may replace the frame 530 as described for the embodiment depicted in FIGS. 1-2 in connection with FIGS. 2 and 7. (The wiring harnesses have been omitted from FIGS. 5 and 6.)

Figure 8:
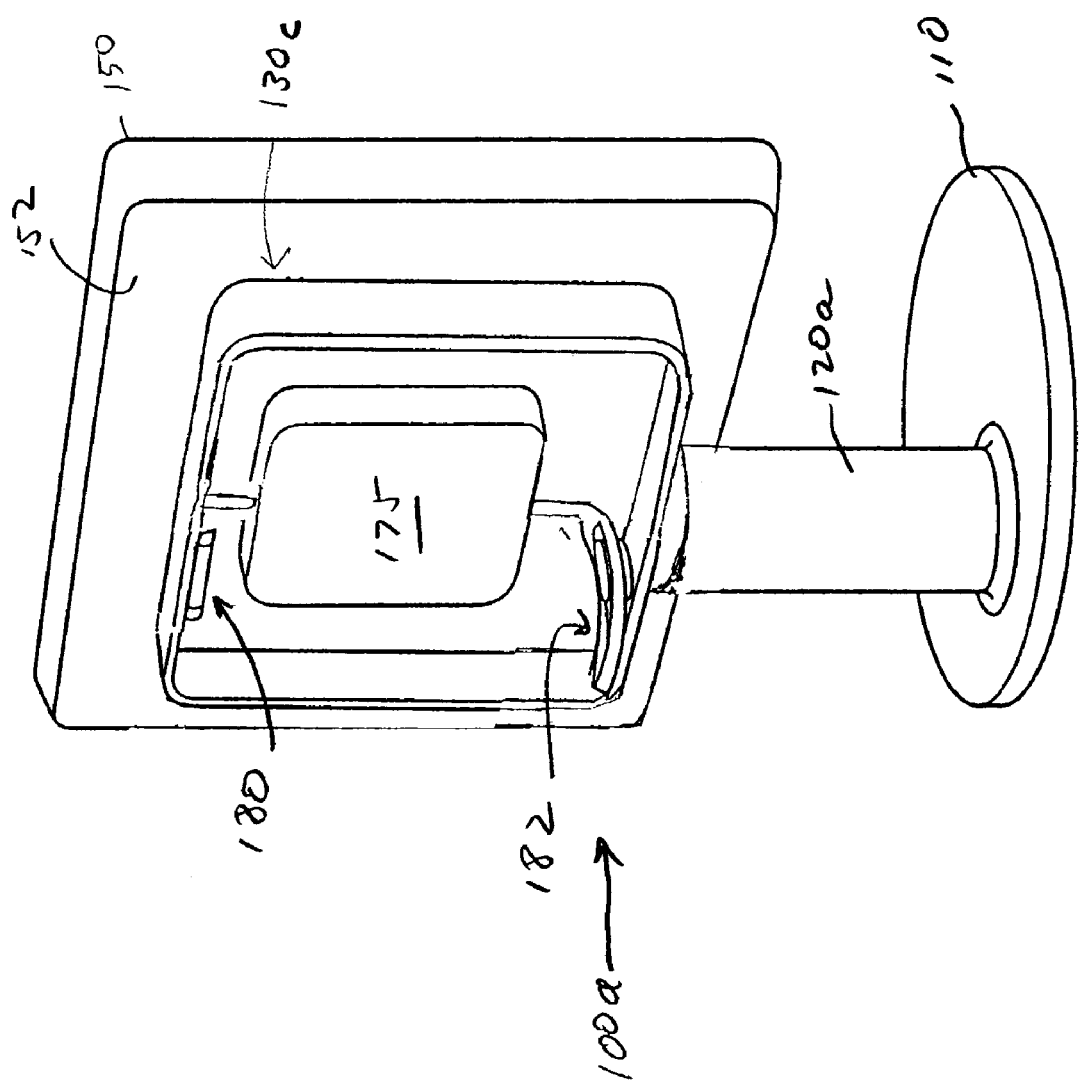
FIG. 8 is a rear perspective view of a flat panel display and a support therefore in accordance with the invention.

Referring to FIG. 8, support 100*a* is provided for a single flat panel display 150. A frame 130*c* is provided, similar in configuration and function, to the frame 130 of the embodiment depicted in FIGS. 1-2. The frame is supported by a vertical column 120*a* at a suitable height, as described above for the other embodiments. A hinge 180 and a slidable coupling 182 are connected to the frame 130*c* as described in connection with the embodiment of FIGS. 1-2. Up/down and left/right tilting operate as described for the embodiment of FIGS. 1-2.

FIG. 9 is an exploded view of the support 100 of the embodiment depicted in FIGS. 1-2, and FIG. 10 depicts portions of FIG. 9 enlarged. The hinge 180 and the pivot joint 210 are discussed below in connection with FIGS. 9 and 10.

The hinge part 185 of hinge 180 comprises a hollow cylinder 350, and the hinge part 184 comprises blocks 357 connected to the upper frame part 131. A shaft 345 extends through the hollow cylinder 350 and is pinned thereto by pins 370 passing through and engaged in holes 375 in the cylinder 350 aligned with holes in the shaft 345. The shaft 345 is thus locked to the cylinder 350 and prevented from rotating. Connected to the ends of shaft 345 are keys 360 that are received in keyways 364 in the blocks 357. The keys 360 may be made of plastic and include a flexible longitudinally extending ear or tab 361 which is received in a longitudinal slot 366 off of a cylindrical bore 365 that forms the keyway in block 357.

Still referring to FIGS. 9 and 10, the tab 361 engaged in the slot 366 defines the home position corresponding to location of the guide button 186 midway in the slot 188 of the slide bracket 187. Application of a suitable force to the display 150 will rotate the shaft and dislodge the tab 361. The tab 361 then wipes the inner circumference of the cylindrical bore 365 and frictionally engages the bore in an adjusted position to maintain the display in an up/down adjusted position. As discussed above, the guide button 186 and the slot 187 provide stops to limit the range of up/down adjustment.

Referring to FIGS. 9 and 10, the pivot joint 210 comprises a friction hinge 305 connected to a bracket 309 that in turn is connected to the rear 152 of display 150. The friction hinge 305 includes four sections, each including a cylindrical part 307 and tab 306. Each tab 306 has a screw hole which is used to connect the hinge 305 to the bracket 309. A shaft 310, connected at opposite ends to the vertical portions 190, 191 of the hinge 180 and sliding coupling 182, is rotatably received in the friction hinge 305. By virtue of this connection of the friction hinge 305 to the hinge 180 and the slidable coupling 182, which can not rotate, the shaft 310 is prevented from rotating. Thus, left/right tilting of the display panel 150 causes the friction hinge 305 to rotate about the shaft 310. The diameter of the friction hinge 305 is selected to frictionally engage the shaft 310 and maintain the display 150 in an adjusted left/right position. The friction hinge 305 may be made of plastic. The frame 130 and the wiring harnesses 140 may limit the maximum left/right adjustment range of the displays 150, 160. However, any suitable stop may be provided to limit adjustment to a lesser range.

Referring to FIG. 9. covers 175a are provided to form and close the compartments 75 depicted in FIG. 2 and other figures. These compartments house electrical components and connectors.

The combination of the hinge 180 and the slidable coupling 182 at two spaced locations, and the friction hinge 305 located between the two spaced locations provides a gimbal-like support adjustable in two mutually perpendicular axes.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention. For example, the location of the pivoting and sliding couplings may be reversed so that the display device pivots from the bottom rather than from the top. Moreover, the use of a pedestal and column is just one possible way to secure the frame. The frame may be secured by appropriate structures to a wall or ceiling, for example.

What is claimed is:

1. A support for at least one flat panel display that permits adjustment of the at least one display about two mutually perpendicular axes, comprising:
    an oblong support element comprising first and second spaced, opposed parts extending in parallel and adapted to extend along the rear of the at least one display;
    a first axis adjustable coupling and a second axis adjustable coupling
    the first axis adjustable coupling comprising a pivot joint connected to the first spaced part and to the second axis adjustable coupling, and a sliding coupling including slidably engaged parts connected to the second spaced part and to the second axis adjustable coupling;
    the second axis adjustable coupling being adapted to be connected to the rear of the at least one display;
    the first axis adjustable coupling being adapted to permit the at least one display to pivot about a first axis at the pivot joint for adjusting the at least one display about the first axis and the second axis adjustable coupling being adapted to permit adjustment of the at least one display about a second axis perpendicular to the first axis;
    the first and second axes adjustable couplings being adapted to define a home position of the at least one display in which the at least one display is parallel to the oblong support element, parallel to a plane and from which the at least one display is adjustable relative to the oblong support element away from the home position equally in opposite directions into a plurality of positions about each of the first and second axes, the at least one display not being parallel to the plane in each of the plurality of positions.

2. A support for at least one flat panel display that permits adjustment of the at least one display about two mutually perpendicular axes, comprising:
    an oblong support element comprising first and second spaced, opposed parts extending in parallel and adapted to extend along the rear of the at least one display, wherein the first and second spaced, opposed parts form part of a loop;
    a first axis adjustable coupling and a second axis adjustable coupling;
    the first axis adjustable coupling being adapted to permit the at least one display to pivot about a first axis for adjusting the at least one display about the first axis and the second axis adjustable coupling being adapted to permit adjustment of the at least one display about a second axis perpendicular to the first axis;
    the first and second axes adjustable couplings being adapted to define a home position of the at least one display in which the at least one display is parallel to the oblong support element, parallel to a plane and from which the at least one display is adjustable relative to the oblong support element away from the home position equally in opposite directions into a plurality of positions about each of the first and second axes, the at least one display not being parallel to the plane in each of the plurality of positions.

3. The support of claim 1, wherein the pivot joint comprises a hinge connected to the first spaced part and to the second adjustable coupling, and the parts of the sliding coupling comprise a guide and a bracket connecting the second axis adjustable coupling and the second spaced part, the bracket having a slot in which the guide is slidably movable.

4. The support of claim 3, wherein the second axis adjustable coupling comprises a pivot joint adapted to be connected to the rear of the at least one display and, at first and second locations thereof, to the first axis adjustable coupling.

5. The support of claim 3, wherein the hinge comprises a friction hinge.

6. The support of claim 1, wherein the first axis adjustable coupling and the second axis adjustable coupling cooperate to provide a gimbal-like adjustment mechanism for the at least one display.

7. The support of claim 1, comprising a vertically extending support member to which the oblong support element is connected and means for supporting the vertically extending support member on a flat horizontal surface.

8. A support for a plurality of flat panel displays that permits adjustment of each display about two mutually perpendicular axes, comprising for each display:
    an oblong support element comprising first and second spaced, opposed parts extending in parallel and adapted to extend along the rear of the display;
    a first axis adjustable coupling and a second axis adjustable coupling;
    the first axis adjustable coupling comprising a pivot joint connected to the first spaced part and to the second axis adjustable coupling, and a sliding coupling including slidably engaged parts connected to the second spaced part and to the second axis adjustable coupling;
    the second axis adjustable coupling being adapted to be connected to the rear of the display;
    the first axis adjustable coupling being adapted to permit the display to pivot about a first axis at the pivot joint for adjusting the display about the first axis and the second axis adjustable coupling being adapted to permit adjustment of the display about a second axis perpendicular to the first axis;
    the first and second axes couplings being adapted to define a home position of the display in which the display is parallel to the oblong support element, parallel to a plane and from which the display is adjustable relative to the oblong support element away from the home position equally in opposite directions into a plurality of positions about each of the first and second axes, the display not being parallel to the plane in each of the plurality of positions.

9. The support of claim 8, wherein the oblong support elements for at least two of the plurality of displays are adapted to hold the displays horizontally aligned.

10. The support of claim 8, wherein the oblong support elements for at least two of the plurality of displays are adapted to hold the displays vertically aligned.

11. The support of claim 8, wherein, for a respective display, the first axis adjustable coupling and the second axis adjustable coupling cooperate to provide a gimbal-like adjustable mechanism for the display.

12. The support of claim 9, comprising means for supporting the two horizontally aligned oblong support elements on a flat horizontal surface.

13. The support of claim 10, comprising means for supporting the two vertically aligned oblong support elements on a flat horizontal surface.

14. A support for at least one flat panel display that permits adjustment of the at least one display about two mutually perpendicular axes, comprising:
  an oblong support element comprising a first and second spaced, opposed parts extending in parallel and adapted to extend along the rear of the at least one display; and
  a first pivot joint adapted to be connected to the rear of at least one display, the first pivot joint having a pivot axis and being adapted to permit the at least one display to be adjusted about the pivot axis;
  a second pivot joint connected to the first spaced part and to the first pivot joint;
  a sliding coupling comprising slidably engaged parts connected to the second spaced part and to the first pivot joint, wherein the second pivot joint and the sliding coupling are adapted to permit adjustment of the at least one display with the first pivot joint connected thereto about an axis perpendicular to the pivot axis;
  the second pivot joint and the sliding coupling, and the first pivot joint connected thereto being adapted to define a home position of the at least one display in which the at least one display is parallel to the oblong support element, parallel to a plane and from which the at least one display is adjustable relative to the oblong support element away from the home position equally in opposite directions into a plurality of positions about the pivot axis and the axis perpendicular thereto, the at least one display not being parallel to the plane in each of the plurality of positions.

15. The support of claim 14, wherein the second pivot joint comprises a hinge connected to the first part of the oblong support element and to the first pivot joint at a first location thereof, and the parts of the sliding coupling comprise a guide button and a bracket connecting the first pivot joint at the second location thereof and the second part of the oblong support element, the bracket having a slot in which the guide button is movable.

16. The support of claim 15, wherein the hinge comprises a friction hinge.

17. The support of claim 14, wherein the first pivot joint, the second pivot joint and the sliding coupling provide a gimbal-like adjustment mechanism for the at least one flat panel display.

18. The support of claim 14, comprising a vertically extending support member to which the oblong support element is connected and means for supporting the vertically extending support member on a flat horizontal surface.

19. The support of claim 14, wherein the support is for a plurality of displays, and wherein the oblong support element or elements for at least two of the plurality of displays are adapted to hold the displays horizontally aligned.

20. The support of claim 14, wherein the support is for a plurality of displays, and wherein the oblong support element or elements for at least two of the plurality of displays are adapted to hold the displays vertically aligned.

21. A support for at least one flat panel display that permits adjustment of the at least one display about two mutually perpendicular axes, comprising:
  an oblong support element comprising a first and second spaced, opposed parts extending in parallel and adapted to extend along the rear of the at least one display, wherein the first and second spaced, opposed parts form part of a loop;
  a first pivot joint adapted to be connected to the rear of at least one display, the first pivot joint having a pivot axis and being adapted to permit the at least one display to be adjusted about the pivot axis;
  a second pivot joint connected to the first spaced part and to the first pivot joint;
  a sliding coupling comprising slidably engaged parts connected to the second spaced part and to the first pivot joint, wherein the second pivot joint and the sliding coupling are adapted to permit adjustment of the at least one display with the first pivot joint connected thereto about an axis perpendicular to the pivot axis;
  the second pivot joint and the sliding coupling, and the first pivot joint connected thereto being adapted to define a home position of the at least one display in which the at least one display is parallel to the oblong support element, parallel to a plane and from which the at least one display is adjustable relative to the oblong support element away from the home position equally in opposite directions into a plurality of positions about the pivot axis and the axis perpendicular thereto, the at least one display not being parallel to the plane in each of the plurality of positions.

22. A support for at least one flat panel display that permits adjustment of the at least one display about two mutually perpendicular axes, comprising:
  a support element comprising spaced first and second opposed parts extending in parallel and adapted to extend along the rear of the at least one display, wherein the first and second spaced, opposed parts form part of a loop;
  a pivot joint connected to the first and second parts of the support element by a hinge and a slidable coupling comprising a bracket and a guide button, the bracket having a slot in which the guide button is movable, the pivot joint being adapted to be connected to the rear of the at least one display with the support extending at the rear of the display, the pivot joint having a pivot axis and being adapted to permit the at least one display to be adjusted about the pivot axis;
  the hinge being connected to the first part and to the pivot joint at a first location thereof, the hinge having a hinge axis which is perpendicular to the pivot axis, the hinge being adapted to permit the at least one display to be adjusted about the hinge axis; and
  the sliding coupling slidably connecting the second part of the support element and the pivot joint at a second location thereof spaced from the first location.

23. The support of claim 22, wherein the hinge comprises a friction hinge.

24. The support of claim 22, comprising a vertically extending support member to which the support element or elements are connected and means for supporting the vertically extending support member on a flat horizontal surface.

25. The support of claim 22, wherein the support is for a plurality of displays, and wherein the oblong support element or elements for at least two of the plurality of displays are adapted to hold the displays horizontally aligned.

26. The support of claim 22, wherein the support is for a plurality of displays, and wherein the oblong support element or elements for at least two of the plurality of displays are adapted to hold the displays vertically aligned.

27. At least one flat panel display and a support therefor that permits adjustment of the at least one display about two mutually perpendicular axes, the support comprising:
   an oblong support element comprising first and second spaced, opposed parts extending in parallel and along the rear of the at least one display;
   a first axis adjustable coupling and a second axis adjustable coupling;
   the first axis adjustable coupling comprising a pivot joint connected to the first spaced part and to the second axis adjustable coupling, and a sliding coupling including slidably engaged parts connected to the second spaced part and to the second axis adjustable coupling;
   the second axis adjustable coupling being connected to the rear of the at least one display;
   the first axis adjustable coupling permitting adjustment of the at least one display about a first axis at the pivot joint and the second axis adjustable coupling permitting adjustment of the at least one display about a second axis perpendicular to the first axis;
   the first and second adjustable axes couplings defining a home position of the at least one display in which the at least one display is parallel to the oblong support element, parallel to a plane and from which the at least one display is adjustable relative to the oblong support element away from the home position equally in opposite directions into a plurality of positions about each of the first and second axes, the at least one display not being parallel to the plane in each of the plurality of positions.

28. A plurality of flat panel displays and a support therefor that permits adjustment of each display about two mutually perpendicular axes, the support comprising for each display:
   an oblong support element comprising first and second spaced, opposed parts extending in parallel and along the rear of the display;
   a first axis adjustable coupling and a second axis adjustable coupling;
   the first axis adjustable coupling comprising a pivot joint connected to the first spaced part and to the second axis adjustable coupling, and a sliding coupling including slidably engaged parts connected to the second spaced part and to the second axis adjustable coupling;
   the second axis adjustable coupling being connected to the rear of the display;
   the first axis adjustable coupling permitting adjustment of the display about a first axis at the pivot joint and the second axis adjustable coupling permitting adjustment of the display about a second axis perpendicular to the first axis;
   the first and second axes adjustable couplings defining a home position of the display in which the display is parallel to the oblong support element, parallel to a plane and from which the display is adjustable relative to the oblong support element away from the home position equally in opposite directions into a plurality of positions about each of the first and second axes, the display not being parallel to the plane in each of the plurality of positions.

29. A support for at least one flat panel display that permits adjustment of the at least one display about two mutually perpendicular axes, comprising:
   an oblong support element comprising first and second spaced, opposed parts extending in parallel and adapted to extend along the rear of the at least one display, wherein the first and second spaced, opposed parts form part of a loop;
   a first axis adjustable coupling connected to each of the first and second spaced, opposed parts; and
   a second axis adjustable coupling connected to the first axis adjustable coupling and adapted to be connected to the rear of the at least one display;
   the first axis adjustable coupling being adapted to permit adjustment of the at least one display about a first axis and the second axis adjustable coupling being adapted to permit adjustment of the at least one display about a second axis perpendicular to the first axis;
   the first axis adjustable coupling comprising a hinge connected to the first spaced part and to the second adjustable coupling, and a sliding coupling comprising a guide button and a bracket slidably connecting the second spaced part and the second axis adjustable coupling, the bracket having a slot in which the guide is slidably movable.

30. A support for at least one flat panel display that permits adjustment of the at least one display about two mutually perpendicular axes, comprising:
   an oblong support element comprising a first and second spaced, opposed parts extending in parallel and adapted to extend along the rear of the at least one display, wherein the first and second spaced, opposed parts form part of a loop; and
   means adapted for adjustably coupling the support element to the at least one display, comprising:
   a pivot joint adapted to be connected to the rear of at least one display, the pivot joint having a pivot axis and being adapted to permit the at least one display to be adjusted about the pivot axis; and
   means connected to the pivot joint at first and second spaced locations thereof and to the first and second spaced parts, respectively, the means being adapted to permit adjustment of the at least one display with the pivot joint connected thereto about an axis perpendicular to the pivot axis;
   the means connected to the pivot joint comprising a hinge connected to the first spaced part of the oblong support element and to the pivot joint at the first location thereof, and a slidable coupling comprising a guide button and a bracket slidably connecting the second spaced part of the oblong support element and the pivot joint at the second location thereof, the bracket having a slot in which the guide button is movable.

* * * * *